United States Patent
Dohanich, Jr.

[11] 3,950,682
[45] Apr. 13, 1976

[54] DIGITAL DC MOTOR VELOCITY CONTROL SYSTEM

[75] Inventor: George J. Dohanich, Jr., Endicott, N.Y.

[73] Assignee: International Business Machines Corporation, Armonk, N.Y.

[22] Filed: Dec. 19, 1974

[21] Appl. No.: 534,250

[52] U.S. Cl. .............. 318/314; 318/318; 318/327; 318/341; 318/345
[51] Int. Cl.² ............................................. H02P 5/16
[58] Field of Search ........... 318/314, 318, 327, 341, 318/345 E

[56] References Cited
UNITED STATES PATENTS

| | | | |
|---|---|---|---|
| 3,331,006 | 7/1967 | Strand et al. | 318/341 X |
| 3,478,178 | 11/1969 | Grace | 318/314 X |
| 3,646,417 | 2/1972 | Cassie et al. | 318/318 |
| 3,838,325 | 9/1974 | Kobayashi et al. | 318/341 X |

Primary Examiner—Gene Z. Rubinson
Attorney, Agent, or Firm—Gerald R. Gugger

[57] ABSTRACT

A velocity control system for a motor is provided wherein first counter means are reset by feedback pulses from the motor to record the feedback period. Decode means responsive to the first counter means determines whether the feedback period is long or short and the status of this is put into storage means. An up-down counter is responsive to the storage means for adjusting the motor drive pulse width and second counter means are reset by the motor feedback pulses to terminate the drive to the motor. Comparing means are responsive to the up-down counter and said second counter means for controlling the motor drive to maintain a precise motor velocity.

9 Claims, 5 Drawing Figures

STEADY LOAD

INCREASED LOAD APPLIED IN STEP FASHION

SLOWLY INCREASING LOAD

DIGITAL DC MOTOR VELOCITY CONTROL SYSTEM

BACKGROUND OF THE INVENTION

In the magnetic ink inscription of documents, the documents are vacuum held on a transport belt which carries them through the inscriber station. Each individual document is sensed and then decelerated for inscribing at the inscriber station where hammers impact through a ribbon at slow speed. After inscribing, the document is accelerated and ejected at high speed. In a transport system of this type, the load range of the drive motor is highly variable depending on the vacuum gripping of the document, belt tension, frictional surfaces, etc. During the inscribing action, it is essential to maintain a constant velocity to insure accuracy of inscribing.

In prior art digital velocity servos for DC motors, such as is shown in the Agin U.S. Pat. No. 3,634,745, the systems are fixed gain servos for a given velocity error. For a given torque change, an error signal has to be generated which means the steady state velocity is in error by an amount dependent on the gain. In servos of analog type, as well as the analog-digital type, there is an upper boundary on the gain. Therefore, there is a lower boundary on velocity tolerance. Upper gain limit is determined by system stability at light load and if a heavy load is applied, velocity must shift an amount determined by the gain and this would be insufficient for the above described inscriber application. These systems were found to have restricted gain limitations, excessive drift and undesirable production set-up and field maintenance.

SUMMARY OF THE INVENTION

The system of the present invention is capable of accommodating a very wide load range on a long term basis while maintaining a tight tolerance on speed with no adjustments. This is due to the fact that the torque applied by the motor is altered to match the mean load torque with essentially no error in velocity. The drive pulse width (average torque) is adjusted until the period of the feedback signal is equal to the desired period and with a resolution of one oscillator period.

The present novel digital DC motor velocity control system controls a motor having an armature with drive circuit means for energizing the armature and having emitter means driven by the armature for producing feedback pulses. A first free running counter is provided which is reset by the feedback pulses for recording the feedback period. Decode latch means are responsive to said first counter for determining whether the feedback period is long or short and trigger means are provided for storing the status of the decode latch. An up-down counter is responsive to said trigger means for adjusting the motor drive pulse width and a second free running counter is reset by the motor feedback pulses to terminate the drive to the motor. Comparing means responsive to the up-down counter and to the second free running counter are provided for controlling the motor drive circuit to maintain a percise angular motor velocity. The up-down counter is varied to produce variable drive to arrive at the correct average speed.

The mode of operation of the present system serves to effectively eliminate drift and load change effects. A fixed speed is obtained independent of load effects and there is no need for any steady state velocity error in speed to produce the output drive. A set-up procedure is required in analog systems to compensate for initial component tolerances and/or to optimize the gain of the servo loop. The present system does not require this because it is self compensating. And the all-logic implementation of the system makes it amendable to high density technologies.

In another embodiment of the present system, suitable AND circuits and inverters have been added to assure proper operation of the system under abnormal or fault conditions. The decode latch is conditioned to evaluate the outputs of the first counter only during the time that these outputs are not being disturbed. Also, the first and second counters and the up-down counter are prevented from wrapping on themselves, i.e., overflowing when they reach their maximum count.

It is, then, a primary object of the present invention to provide a novel and improved digital DC motor velocity control system.

A further object of the present invention is to provide a novel and improved DC motor velocity control system wherein fixed motor speed is obtained independent of load effects.

A still further object of the present invention is to provide a novel and improved digital DC motor velocity control system wherein up-down counter circuit means are provided to produce variable drive to arrive at the correct average motor speed.

A further object of the present invention is to provide a novel and improved digital DC motor velocity control system which is responsive to motor feedback pulses and which includes means for adjusting the drive pulse width until the period of the feedback signal is equal to the desired period and with a resolution of one oscillator period.

Another object of the present invention is to provide a novel and improved digital DC motor velocity control system which includes AND circuit means and inverter circuit means for assuring proper operation of the system under abnormal or fault conditions.

The foregoing and other objects, features and advantages of the invention will be apparent from the following more particular description of preferred embodiments of the invention as illustrated in the accompanying drawings.

DESCRIPTION OF PREFERRED EMBODIMENTS

Figure 1:
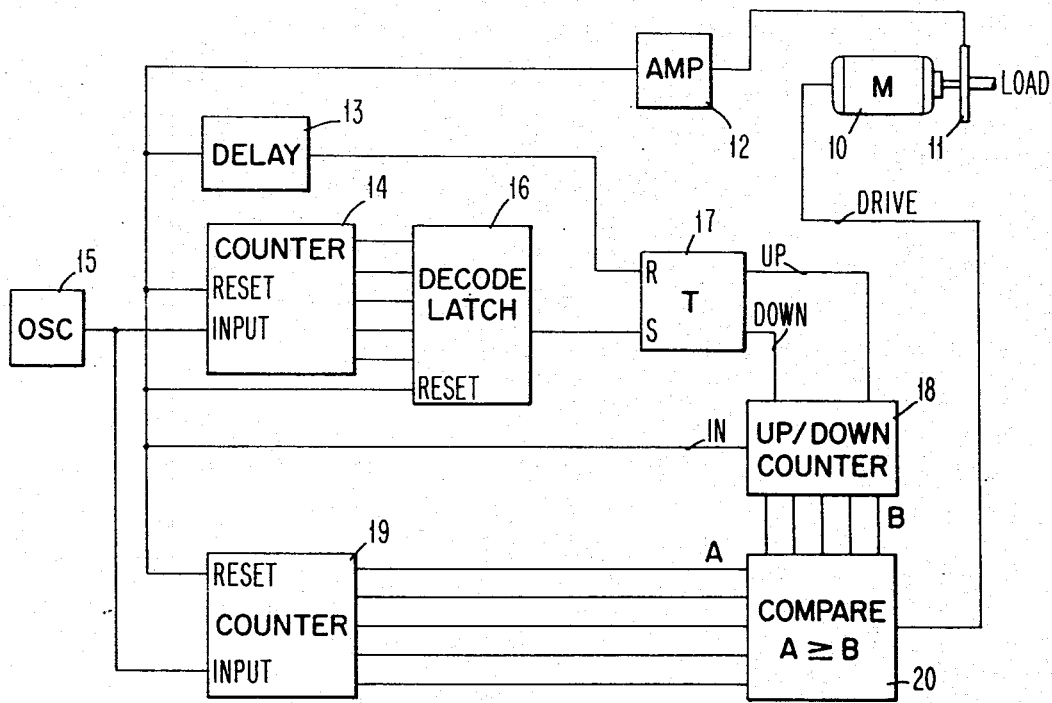
FIG. 1 is a schematic diagram of a preferred embodiment of the motor velocity control system of the present invention.

Referring to FIG. 1, the control system of the present invention is shown applied to a DC motor 10. Attached to the shaft of motor 10 is an emitter 11 which in conjunction with a suitable amplifier 12 provides feedback pulses consisting of digital signals whose period conveys motor velocity information. The output of amplifier 12 is taken to a delay block 13. Delay 13 may consist of cascaded logic blocks to get the appropriate delay or it may consist of the conventional R-C delay type delay circuit. As will be seen, delay 13 provides a signal to eliminate race conditions.

A conventional Eccles-Jordan type binary counter 14 has its input connected to a crystal oscillator 15 and the counter is free running. All stages of counter 14 are reset in AC fashion by the leading edge of the feedback pulses from amplifier 12 and, thus, the maximum value just prior to reset is the time period between feedback pulses. The outputs of counter 14 are taken to a decode latch 16 which is also reset by the leading edge of the feedback pulses from amplifier 12. Decode latch 16 is a conventional decode through an AND block of adequate dimensions followed by a latch to logically hold the fact that the decode has been reached. The decode latch is hard-wired, or may be made programmable, to represent the desired time period between the feedback pulses.

Counter 14 is free running under control of the crystal oscillator 15 and if the value of the counter exceeds or equals the value fixed by the decode latch 16, the output of the decode latch will set a trigger 17. Trigger 17 is a conventional AC set and reset trigger and it provides an up-down counter 18 with the gate to control the counting direction. Counter 18 is a conventional five stage binary up-down counter with a gate to determine the direction of count. The setting of trigger 17 will gate the up-down counter into a count down mode. At the next feedback pulse edge from amplifier 12, the up-down counter 18 is decremented one count. This feedback pulse delayed by delay block 13 resets trigger 17 to restore the system. Delay 13 guarantees that the up-down counter has had time to respond.

If counter 14 does not reach the decode value in decode latch 16, trigger 17 remains in the reset state to gate the up-down counter in an up count mode. The edge of the feedback pulse will increment the up-down counter by one count after which trigger 17 will reset to restore the system.

If counter 14 reaches or exceeds the value set in decode latch 16, the indication is that the feedback period is in excess of the period desired and therefore the motor speed is too slow. If the value in the decode latch is not reached, the indication is that the feedback period is less than the period desired and therefore the motor speed is too fast. The contents of the up-down counter 18 is modified to reflect the speed error.

The system loop is closed by a counter 19 and a comparator 20. Counter 19 is a binary counter similar to counter 14 and is responsive to only two inputs. It is free running under control of the crystal oscillator 15 to count up and it is reset back to zero by the feedback pulses from amplifier 12. Comparator 20 is a conventional five stage T²L module which compares the value A in counter 19 against the value B in the up-down counter 18 and produces an output to control the drive of the motor 10. If the value A in counter 19 is less than value B in the up-down counter 18, the output of comparator 20 will be down or negative and no drive will be supplied to the motor. If value A equals or exceeds value B, the output of comparator 20 will go up or positive and a drive pulse will be supplied to the motor.

In the operation of the system, assume that motor 10 is running at constant velocity. A first probable thing that will happen is that the first feedback pulse will reset counters 14 and 19 and trigger 17 before the decode value in decode latch 16 is arrived at. Also, assume a steady state condition that the up-down counter 18 contains the precise count required to sustain the desired velocity. Since the decode value was not arrived at, trigger 17 remains in a reset condition and the up-down counter 18 gates to an up count mode. The next feedback pulse edge increments the up-down counter increasing its value one count. Counter 19 was AC reset by this feedback pulse and the motor drive will be terminated because value A is less than value B. Counter 19 starts counting on the next oscillator pulse from crystal oscillator 15. There has been no drive supplied to the motor as yet. When the value A in counter 19 reaches the value B in the up-down counter, the output of comparator 20 will go positive to start driving the motor.

There has been no change in motor velocity up to this point. Since the drive was initiated later in the feedback period, the velocity of the motor will become slightly lower and the feedback period will be longer by an amount adequate to get a decode out of decode latch 16. For simplicity, it can be assumed that this will occur within the feedback period discussed above. In reality, the load torque and inertia will determine the response time of the system. Occurrence of a decode output from decode latch 16 will set trigger 17 which conditions the up-down counter 18 to count down. At the occurrence of the next feedback pulse edge, up-down counter 18 will decrement one count and counters 14 and 19 are reset. A short interval later, determined by delay block 13, trigger 17 is reset. Trigger 17 is a temporary storage that can be reset in AC fashion. Value A is now greater than value B to increase the drive. Comparator 20 starts the next drive pulse earlier, i.e., a wider drive pulse to increase the speed of the motor. At the next feedback pulse edge, the above sequence is repeated.

Figure 2A:
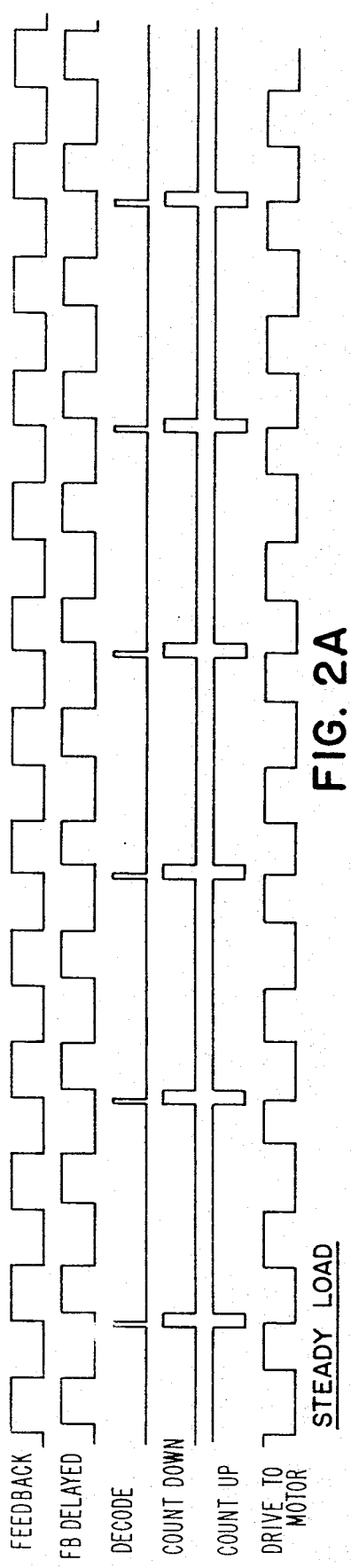
FIGS. 2A, 2B and 2C are diagrammatic waveform illustrations showing the manner of operation of the control system of FIG. 1.

Thus, for a fixed value of the up-down counter 18 and a stable period of feedback, i.e., constant speed, a pulse width modulated drive train is generated. Since the system has but two states, too fast or too slow, such a stable situation cannot occur. Rather, if the period was marginally long, the up-down counter would be decremented thereby increasing the drive pulse width and increasing the speed. At the next period, or some subsequent period, the increase in speed will result in no decode thereby incrementing the up-down counter and decreasing the drive pulse width. For a stable load, this cycle will repeat with small variations around the nominal speed. This situation is illustrated by the waveforms shown in FIG. 2A.

Figure 2B:
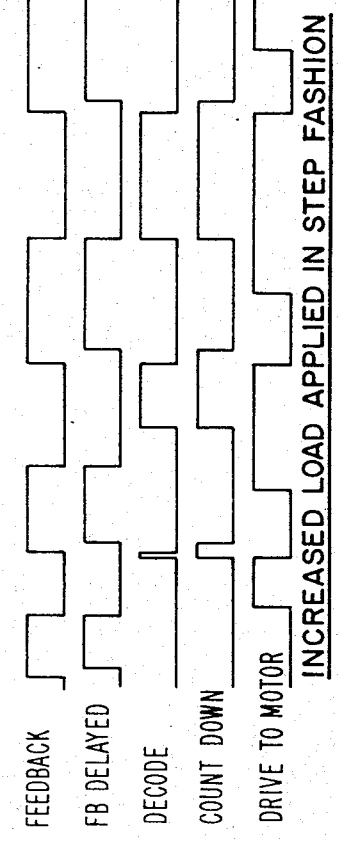

FIG. 2B illustrates the operation of the circuit in the presence of a large load applied in a step fashion. Assume that the loop is steady state at a first load torque and that there is applied a step function to a larger steady state torque value. In this condition, the speed will decrease at a rate determined by the system inertia and the magnitude and percentage change in load coupled with loop response.

As the speed decreases, the drive rate decreases since the drive frequency is determined by the feedback. However, the drive pulse width and duty cycle also increase since the feedback period extends beyond the value in up-down counter 18. The speed will decrease until the duty cycle of the drive is sufficient to sustain the load torque.

Now, however, the low speed results in decrementing the up-down counter 18 increasing the pulse width and, therefore, speed until equilibrium is achieved.

It can be seen that the drive pulse train is variable frequency for large abrupt load changes.

Figure 2C:
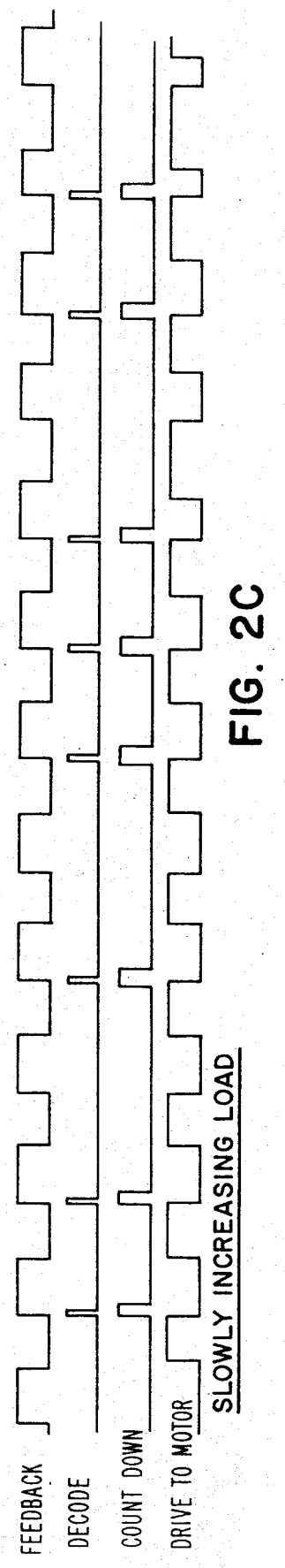

A slow application of load results in no significant changes in frequency while the pulse width increases to accommodate the increasing load. This condition is illustrated in FIG. 2C.

Decreasing loads are accommodated by increasing the up-down counter 18 thereby decreasing the drive pulse width and speed.

Figure 3:
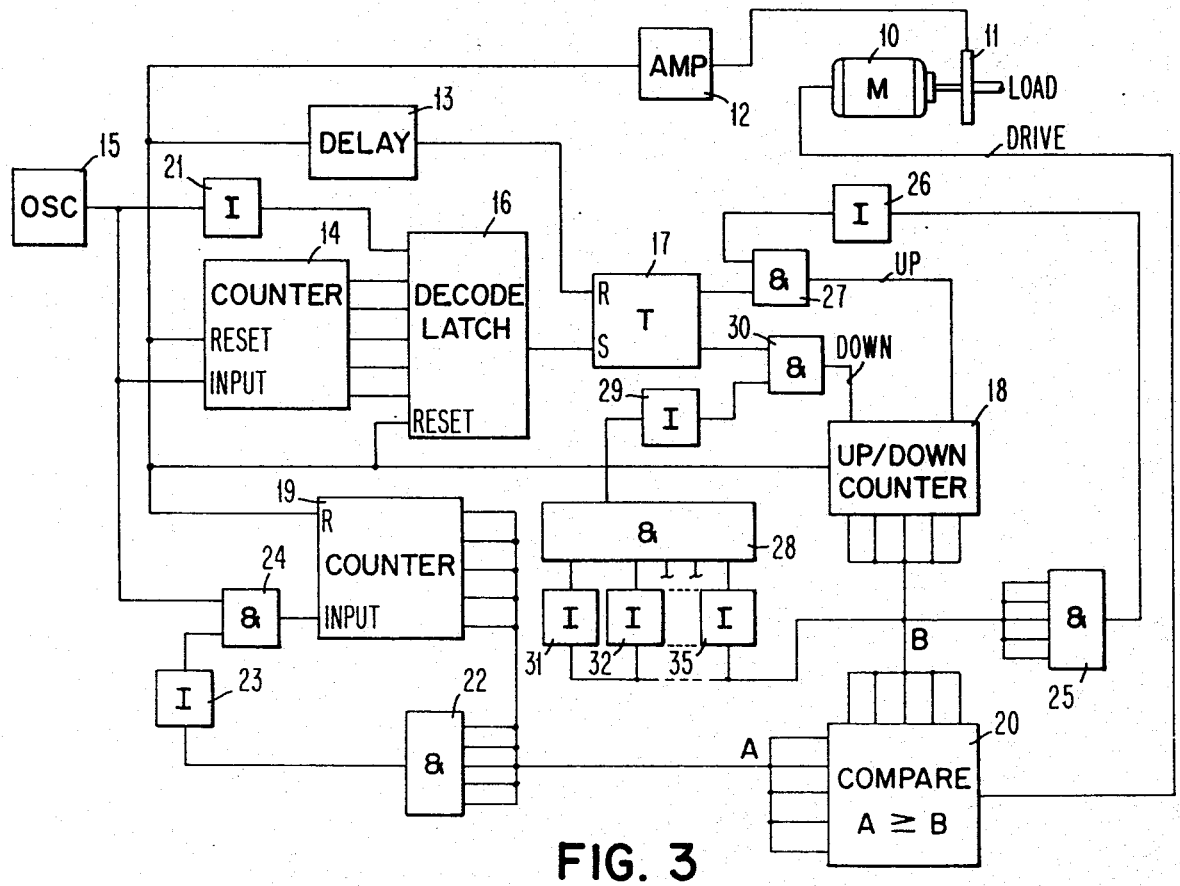
FIG. 3 is a schematic diagram of another embodiment showing the circuit of FIG. 1 with protection circuits added.

Referring now to FIG. 3, there is shown the above described circuit of FIG. 1 with AND gates and inverter added to assure proper operation of the system under abnormal or fault conditions.

An inverter 21 is connected between the oscillator 15 and the decode latch 16 to make sure that the decode latch evaluates the outputs of counter 14 only during the time that these outputs are not being disturbed. In other words, the output pulses from the oscillator are inverted by inverter 21 to inhibit the decode latch during input pulse times to counter 14.

An AND gate 22 in conjunction with inverter 23 and AND gate 24 are provided to assure that counter 19 will not wrap on itself or overflow upon reaching its maximum count. Such wrapping would significantly alter the servo system response to abnormal conditions, such as, an abnormal high load start up torque from a stall condition. AND gate 22 is connected to all of the outputs of counter 19. If not all outputs of counter 19 are present, AND gate 22, through the inverter 23, enables the AND gate 24 thereby permitting the application of pulses from oscillator 15 to the counter 19. However, upon the occurrence of a maximum count in counter 19, AND gate 22 is conditioned and its output, through the inverter 23, inhibits AND gate 24 to remove oscillator 15 from the input of counter 19. This condition will prevail until the occurrence of an emitter feedback pulse.

AND gate 25, inverter 26 and AND gate 27 will in similar fashion prevent an overflow or wrap of the up-down counter 18. Upon the presence of all bits on the output of the up-down counter 18, AND gate 25 will be conditioned and its output, through the inverter 26, will inhibit the AND gate 27 to prevent any signal from reaching the "UP" line to the up-down counter. This condition will prevail until the removal of the all bit condition. In the absence of one or more bits on the output of the up-down counter, AND gate 25 and inverter 26 will condition AND gate 27 to permit signals to the "UP" line.

In a similar fashion, AND gate 28, inverter 29, AND gate 30, and the inverters 31–35 detect the presence of a no-bit condition on the output of the up-down counter 18 in which case the AND gate 30 will be inhibited to prevent a signal from reaching the "DOWN" line for a no-bit condition. This condition will prevail until the removal of the no-bit condition.

With the presence of one or more bits on the output of up-down counter 18, the AND gate 30 will be conditioned to permit signals to the "DOWN" line.

The circuits in FIGS. 1 and 3 have been shown using 5 bit lines as one illustration and it will be understood that the system is not limited to this number and could employ any number that would be feasible.

While the invention has been particularly shown and described with reference to preferred embodiments thereof, it will be understood by those skilled in the art that various changes in form and details may be made therein without departing from the spirit and scope of the invention.

What is claimed is:

1. In a control system for a motor having an armature with drive circuit means for energizing said armature and having emitter means driven by said armature for producing feedback pulses,
    first free running counter means reset by said feedback pulses for recording the feedback period;
    decode latch means responsive to said first counter means for determining whether the feedback period is long or short;
    trigger means for storing the status of said decode latch;
    an up/down counter responsive to said feedback pulses and gated by said trigger means for adjusting the motor drive pulse width;
    second free running counter means reset by said feedback pulses to terminate the drive to the motor; and
    comparing means responsive to said up/down counter and said second free running counter means for controlling said motor drive circuit means to maintain a precise motor velocity.

2. In a control system for a motor having an armature with drive circuit means for energizing said armature and having emitter means driven by said armature for producing feedback pulses;
    oscillator means;
    first free running counter means driven by said oscillator means and reset by said feedback pulses for recording the feedback period;
    decode latch means set to a value to represent the desired time period between said feedback pulses and responsive to said first free running counter means for determining whether the feedback period is long or short;
    trigger means reset by said feedback pulses and set by said decode latch means for storing the status of the decode latch;
    an up-down counter responsive to said feedback pulses and gated into an up count mode or a down count mode depending on the status of said trigger means;
    second free running counter means driven by said oscillator means and reset by said feedback pulses to terminate the drive to the motor; and
    comparing means responsive to the output of said up-down counter and the output of said second free running counter means for providing drive pulses to said motor drive circuit means to maintain a precise motor velocity.

3. The control system as defined in claim 2 and including delay means for the reset of said trigger means to provide sufficient response time for said up-down counter.

4. In a control system for a motor having an armature with drive circuit means for energizing said armature and having emitter means driven by said armature for producing feedback pulses;
    oscillator means;
    first free running counter means driven by said oscillator means and reset by said feedback pulses for recording the feedback period;
    decode latch means set to a value to represent the desired time period between said feedback pulses and connected to the output of said first free running counter means;
    trigger means reset by said feedback pulses and set by the output of said decode latch means when the value in said first free running counter means equals or exceeds the value in said decode latch means;

an up-down counter responsive to said feedback pulses and gated in a count down mode when said trigger means is set;

second free running counter means driven by said oscillator means and reset by said feedback pulses to terminate the drive to the motor; and comparing means responsive to the output of said up-down counter and the output of said second free running counter means and effective to provide a drive pulse to the motor drive circuit means only when the output value of said second free running counter means equals or exceeds the output value of the up-down counter.

5. The control system as defined in claim 3 wherein said trigger means remains in a reset stage when the value in said first free running counter means is less than the value in said decode latch means, and said up-down counter is gated in an up count mode when said trigger means is in the reset stage.

6. In a control system for a motor having an armature with drive circuit means for energizing said armature and having emitter means driven by said armature for producing feedback pulses;

oscillator means;

first free running counter means driven by said oscillator means and reset by said feedback pulses for recording the feedback period;

decode latch means preset to a value to represent the desired time period between said feedback pulses and connected to the output of said first free running counter means;

said decode latch means producing an output pulse when the value in said first free running counter means equals or exceeds said preset value indicating that the feedback period is in excess of the period desired and the motor speed is too slow and producing no output pulse when the value in said first free running counter means is less than said preset value indicating that the feedback period is less than the period desired and the motor speed is too fast;

trigger means reset by said feedback pulses and set by an output pulse from said decode latch means;

an up-down counter responsive to said feedback pulses and gated in a count down mode when said trigger means is set and in a count up mode when said trigger means is in a reset stage, whereby the contents of said up-down counter is varied to reflect motor speed variance;

second free running counter means driven by said oscillator means and reset by said feedback pulses to terminate the drive to the motor; and comparing means responsive to the output of said up-down counter and the output of said second free running counter means and effective to provide a drive pulse to the motor drive circuit means only when the output value of said second free running counter means equals or exceeds the output value of the up-down counter.

7. A control system as defined in claim 6 and including inverter means connecting said oscillator means with said decode latch means whereby said decode latch means is prevented from evaluating the outputs from said first free running counter means during input pulse times to said first free running counter means.

8. A control system as defined in claim 6 and including AND gate and inverter circuit means connected between the output and input of said second free running counter means to prevent an overflow when it reaches a maximum count.

9. A control system as defined in claim 6 and including AND gate and inverter circuit means connected between the output of said up-down counter and the output of said trigger means to prevent the up-down counter from being gated in the count up mode upon the presence of all bits on its output and also to prevent the counter from being gated in the count down mode for a no bit condition on its output.

* * * * *